United States Patent
Cole

(10) Patent No.: US 7,712,727 B1
(45) Date of Patent: May 11, 2010

(54) AIR CUSHION VEHICLE BOW SKIRT RETRACTION SYSTEM

(75) Inventor: Robert E. Cole, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 314 days.

(21) Appl. No.: 11/900,146

(22) Filed: Sep. 4, 2007

(51) Int. Cl.
*B66D 1/36* (2006.01)

(52) U.S. Cl. ............... 254/284; 254/281; 114/67 A; 180/121; 180/122; 180/127

(58) Field of Classification Search .......... 254/278, 254/279, 280, 281, 283, 284, 288; 114/67 A; 180/116–129
See application file for complete search history.

(56) References Cited

U.S. PATENT DOCUMENTS

| | | | | |
|---|---|---|---|---|
| 4,422,517 A | * | 12/1983 | Hammerschlag | 180/127 |
| 4,494,473 A | * | 1/1985 | Simpson | 114/67 A |
| 4,658,926 A | * | 4/1987 | Paradis, IV | 180/126 |
| 5,542,366 A | * | 8/1996 | Bell | 114/67 A |
| 5,775,767 A | * | 7/1998 | Harrison et al. | 296/107.09 |
| 6,487,981 B1 | * | 12/2002 | Burg | 114/67 A |

FOREIGN PATENT DOCUMENTS

| JP | 04278876 A | * | 10/1992 |
|---|---|---|---|
| JP | 2003285733 A | * | 10/2003 |

* cited by examiner

*Primary Examiner*—Emmanuel M Marcelo
(74) *Attorney, Agent, or Firm*—James T. Shepherd

(57) ABSTRACT

A system and method retracts and lets-out a laterally extending flexible bow seal on an air cushion vehicle having a bow ramp. Attachment loops on the forward outside surface of the bow seal receive a skirt cable. A separate cable routing system is connected to opposite ends of the skirt cable for selectively retracting and letting-out the bow seal. The cable routing systems also include ramp cables connected to the bow ramp to raise or lower the bow ramp. The cable routing systems retract the bow seal with the skirt cable simultaneously as the bow ramp is lowered by letting out the ramp cables, and the cable routing systems let-out the bow seal with the skirt cable simultaneously as the bow ramp is raised by drawing in the ramp cables.

6 Claims, 4 Drawing Sheets

AIR CUSHION VEHICLE BOW SKIRT RETRACTION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to high speed marine vehicles utilizing air cushion principles to increase performance. More particularly, this invention is for an air cushion vehicle such as a surface effect ship or hovercraft having a bow ramp and forward flexible seal provided with means for mechanically retracting the forward flexible seal to prevent its contact and damage between the vehicle and an off-loading surface.

Both the surface effect ship (SES) and hovercraft are types of high-speed marine vehicles referred to as air-cushioned vehicles (ACV). They ride on pressurized cushions of air that separate the vehicle from the surface over which it operates. This permits much lower drag and allows greater speeds to be achieved when compared to conventional displacement hulls of equivalent power. The air cushion is contained beneath the vehicle by a flexible skirt seal system which conforms to the irregular operating surface. The seal provided by this skirt reduces the flow of air escaping from the cushion. These vehicles may also utilize a swinging bow ramp for entry and exit of cargo.

In order to maintain performance in increasing sea states, the height of the skirt and total amount of skirt material must be increased to prevent contact between the vehicle and the waves to avoid creating additional drag. Also, in order to maintain proper forward cushion stability during impacts of waves, the laterally extending bag or seal at the bow must increase in diameter as well. The technology push into operation at higher sea states is causing the skirt seals of the craft to be made even larger. This direction in the design of air cushion vehicles creates a problem during landing and loading/unloading operations, as the skirt deflates and the excess bag material of the front seal comes to rest along the sides and front of the vehicle. When the bow ramp is lowered to allow transit of vehicles on or off the craft, the landing pads of the lowered bow ramp can contact and rest on the slack bow bag, resulting in significant wear and/or puncture damage. The traversing of heavy vehicles, such as tanks going on and off the craft, increase this damage rate and create possible further damage by pinching the flexible seal between the ramp and underlying land or dock surface. As the performance envelope for ACVs continues to drive toward increasing sea states and increasing skirt heights, the vulnerability of skirt damage due to ramp systems, and the corresponding costs to replace damaged skirts will increase.

FIG. 1 depicts a disadvantageous limitation of a prior art conventional air cushion vehicle 5 mounting a laterally extending forward flexible seal 6 as part of its skirt at the bow of the vehicle. The possibility of puncturing, pinching and/or excessive wearing damage of forward seal 6 (shown in its deflated or off-cushion condition) at the bow of vehicle 5 is clearly apparent during off-loading at a landing or supporting dock surface 7. A rotatable bow ramp 8 is rotated to its lowered position as viewed from starboard, and ramp landing pads 9 bear against and pinch the rubber coated or impregnated fabric material of the deflated, flattened seal 6 against supporting surface 7. The possibility of damage of the rubber coated or impregnated fabric material of seal/skirt 6 is high, particularly when heavily laden vehicles are off-loaded, and replacement of this damaged item can remove vehicle 5 from service for extended periods during refurbishment.

Some vehicles are currently equipped with skirt retraction aids utilizing elastic cords that extend across and are attached on the inside of the skirt. The elastic cords develop tension by being elongated during inflation of the skirt seal. Once the flow of air is stopped, the skirt will deflate under its own weight and the residual tension in the elastic cords causes the bow seal to fold over on itself, away from the lowering bow ramp, thus providing the necessary clearance. However, these currently deployed skirt retraction systems have limited life due to the operating environment. The constant exposure to salt and vibration of the skirt while underway plus vibration due to wave impacts degrades the material of the elastic cords over time. Another problem with the current system is that elastic materials stretch linearly as a function of displacement. As the diameter of bow skirt seals become larger and more massive, the length and required tension must increase accordingly to effectively function. Depending on the specific geometry of the bow seal, corrosion and oil resistance, elastic materials may or may not be able to satisfy the elongation verses tension requirements, particularly on the larger seals.

Thus, in accordance with this inventive concept, a need has been recognized in the state of the art for a system for reliably retracting the flexible seal at the bow of an air cushion vehicle during off-loading at the water-land interface to reduce the possibility of damage and/or undue wear of the seal.

SUMMARY OF THE INVENTION

The present invention provides a system and method for retracting and letting-out a laterally extending flexible bow seal on an air cushion vehicle having a bow ramp. Attachment loops on the forward outside surface of the laterally extending flexible bow seal receive an elongate skirt cable. A separate cable routing system is connected to opposite ends of the elongate skirt cable for retracting and letting-out the laterally extending flexible bow seal. Cable routing systems also connect ramp cables to the bow ramp to draw-in ramp cables to raise the bow ramp or let-out the ramp cables to lower the bow ramp onto a surface. Cable routing systems retract the flexible bow seal with the skirt cable simultaneously as the bow ramp is lowered with let-out ramp cables or the cable routing systems let-out the flexible bow seal with the skirt cable simultaneously as the bow ramp is raised with drawn-in ramp cables. Each cable routing system includes a fixed pulley and a moveable pulley displaceable toward and away from the fixed pulley by a linear actuator. Each moveable pulley is displaced by a separate linear actuator of each cable routing system toward its associated fixed pulley to simultaneously retract the laterally extending flexible bow seal with the skirt cable and lower the bow ramp with let-out ramp cables to allow the bow ramp to rest on a support surface. Each moveable pulley can also be displaced by a separate linear actuator of each cable routing system away from its associated fixed pulley to simultaneously let-out the laterally extending flexible bow seal with the skirt cable and raise the bow ramp with drawn-in ramp cables to a position above the vehicle.

An object of the invention is to provide a system and method for preventing damage to a flexible seal laterally extending from port to starboard across the bow of an air cushion vehicle.

Another object of the invention is to provide a system and method for preventing damage to a flexible seal at the bow of an air cushion vehicle during off-loading and on-loading of cargo.

Another object of the invention is to provide a system and method to retract and extend a flexible seal at the bow of an air cushion vehicle.

Another object of the invention is to provide a system and method to retract a flexible seal at the bow of an air cushion vehicle and prevent damage to it during off-loading and on loading of cargo.

Another object of the invention is to provide a system and method to retract a flexible seal laterally extending across the bow of an air cushion with an elongate flexible cable laterally extending adjacent to the flexible seal.

Another object of the invention is to provide a system and method to retract and extend a flexible seal laterally extending across the bow of an air cushion with an elongate flexible cable laterally extending adjacent to the flexible seal to prevent damage to the seal during off-loading and on loading of cargo, and to allow extension of the seal for proceeding underway.

Another object of the invention is to provide a system and method to retract a flexible seal laterally extending across the bow of an air cushion with an elongate flexible cable without relying on elastic material properties or other structure laterally extending outside of or below or adjacent to the flexible seal.

Another object of the invention is to provide a system and method to retract and extend a flexible seal laterally without relying on elastic material properties extending across the bow of an air cushion with an elongate flexible cable laterally extending outside of and adjacent to the flexible seal to prevent damage to the seal during off-loading and on loading of cargo.

These and other objects of the invention will become more readily apparent from the ensuing specification when taken in conjunction with the appended claims.

DESCRIPTION OF THE PREFERRED EMBODIMENT

Figure 1:
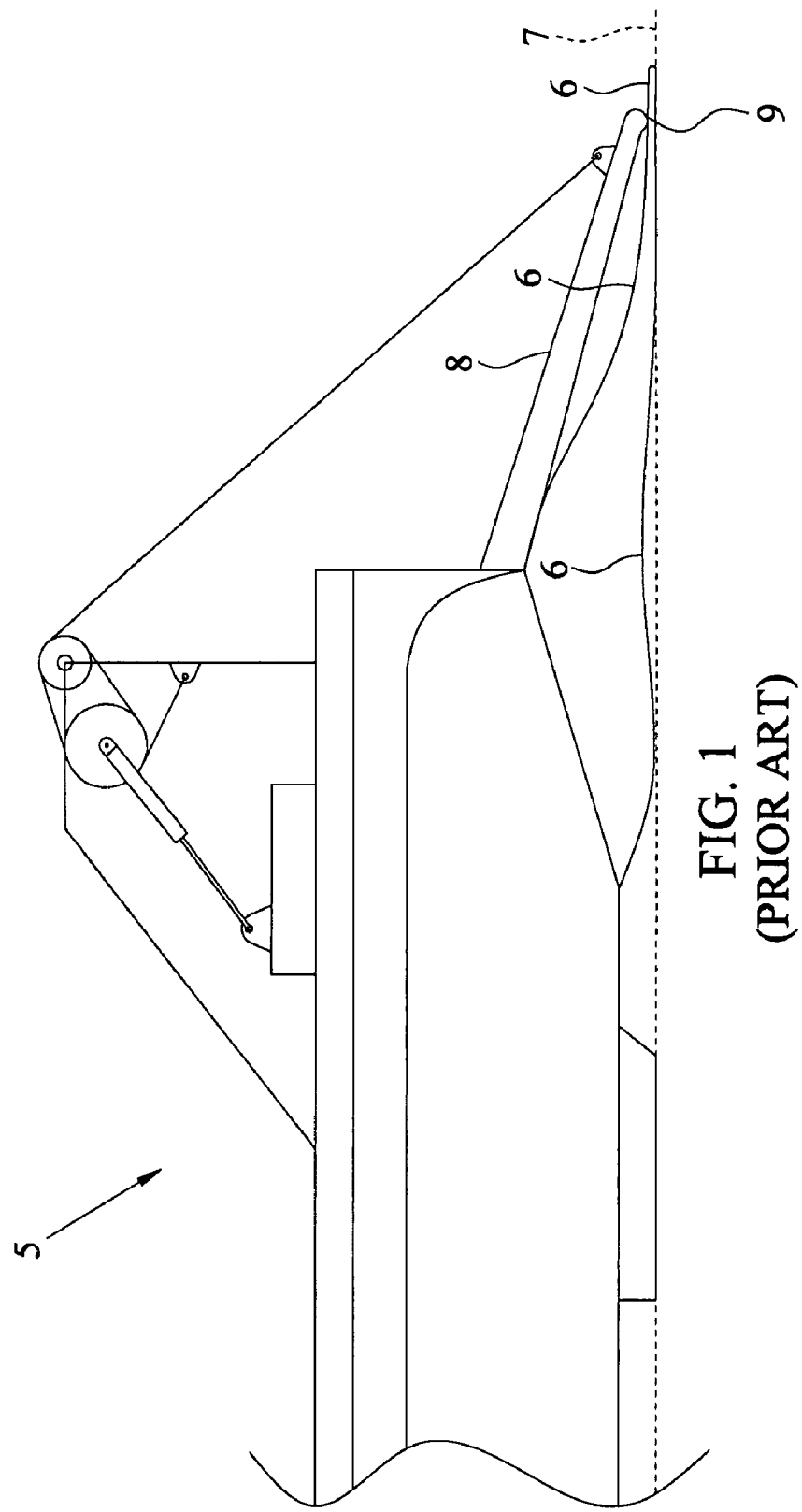
FIG. 1 is a schematic side view of the starboard side of the bow portion of a conventional prior art air cushion vehicle not having the seal retraction system of the invention and showing pinching of the deflated seal between the lowered bow ramp and the supporting surface of a landing.
Figure 2:
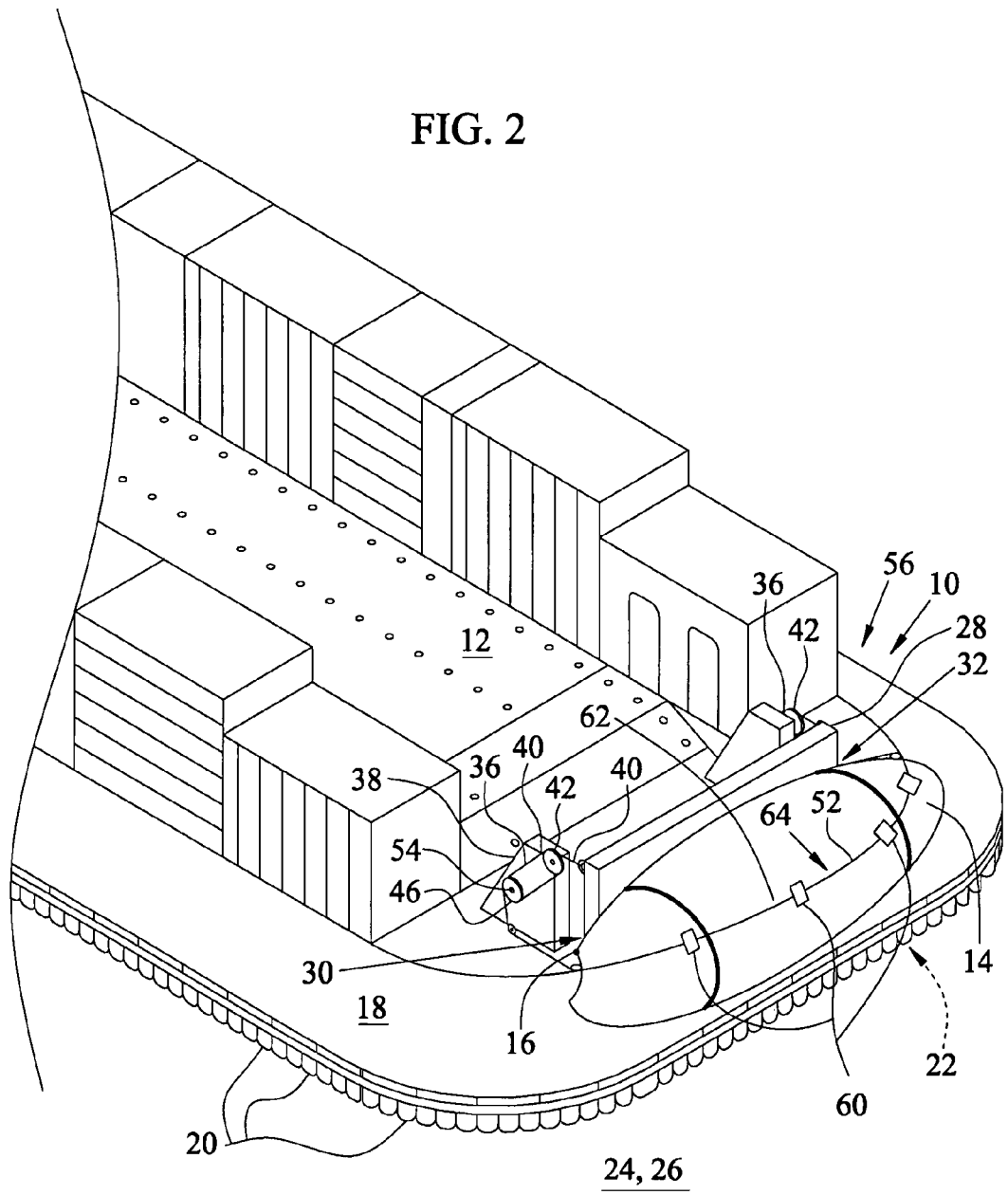
FIG. 2 is an isometric view of the forward part of an air cushion vehicle on-cushion and having the retraction system of the invention.

Referring to FIG. 2, bow skirt seal retraction system 10 of the invention extends across the bow from port side to starboard side of an air cushion vehicle 12. Retraction system 10 selectively retracts an elongate, essentially tubular-shaped laterally extending flexible bow seal 14 connected along elongate juncture 16 to the bow from port to starboard side to prevent pinching or excessive abrading of flexible bow seal 14 during on-loading or off-loading of vehicle 12.

Tubular-shaped flexible bow seal 14 is an enlarged portion of a coextensive tubular flexible seal 18 connected around the lower periphery of vehicle 12 and depending, overlapping finger-shaped strips 20 connected to seals 14 and 18 help contain a pressurized air cushion 22 that supports vehicle 12. Flexible bow and coextensive seals 14 and 18 and strips 20 are typically made from rubber coated or rubber impregnated strong, flexible fabric materials or equivalent compositions to interface with water surface 24 and land surface 26 to maintain air cushion 22 on water or land. Sufficient volumes of pressurized air are created and maintained for air cushion 22 by well known machinery on vehicle 12 to support/propel vehicle 12 across water and land.

Figure 3:
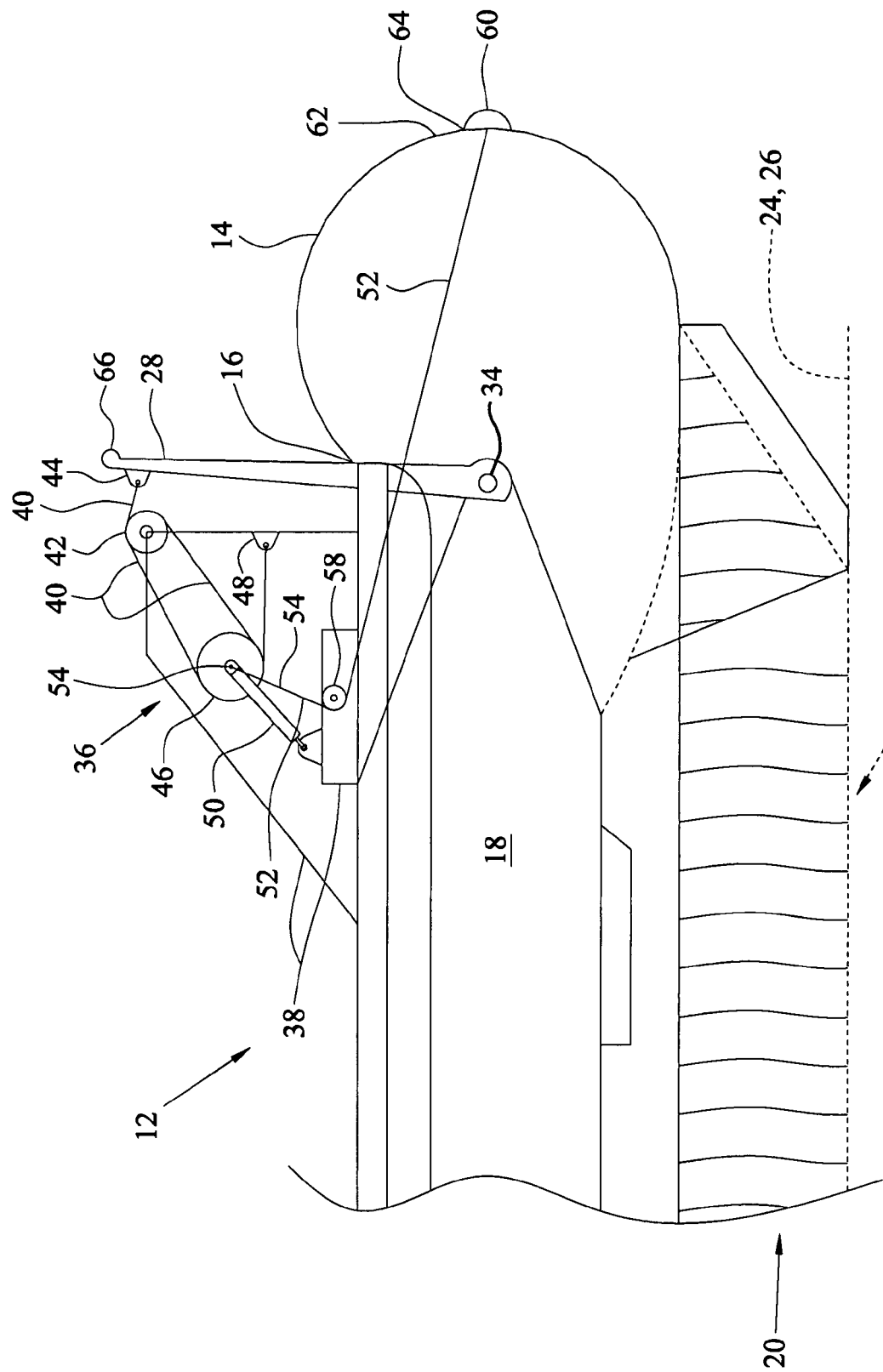
FIG. 3 is a schematic side view of the starboard side of an air cushioned vehicle operating on-cushion inside of an inflated laterally extending flexible seal at the bow above a flat supporting surface with its bow ramp in the full-up position and having the retraction system of the invention in the extended position.
Figure 4:
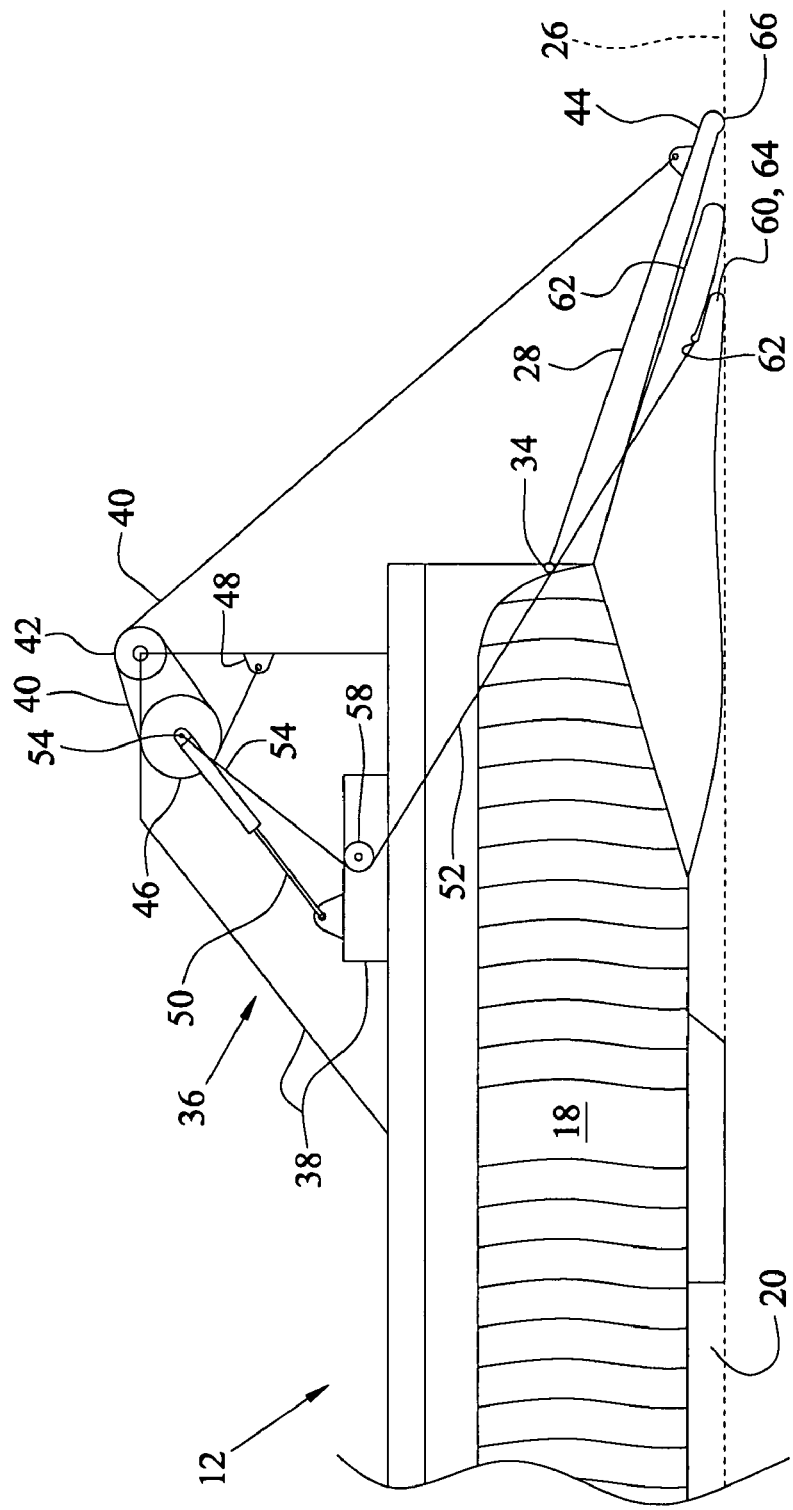
FIG. 4 is a schematic side view of the starboard side of an air cushioned vehicle operating off-cushion and having the laterally extending flexible seal at the bow retracted by the retraction system of the invention, and the bow ramp in the lowered position on a flat' supporting surface.

Referring also to FIGS. 3 and 4, a bow ramp 28 laterally extends from port to starboard across the bow of vehicle 12 for off-loading or on-loading vehicles and personnel between vehicle 12 and land surface 26. Bow ramp 28 is hinged or pivotally mounted at its opposite ends 30 and 32 to vehicle 12 in at least one hinge structure 34 to permit bi-directional rotation of ramp 28 to an upward extending position during on-cushion transit of vehicle 12 as shown in FIGS. 2 and 3 or to a lowered position during off-loading or on-loading while vehicle 12 is off-cushion as shown in FIG. 4.

Bow skirt seal retraction system 10 of the invention has two separate cable routing systems 36 each located at opposite ends of ramp 28 and mounted on vehicle 12 via a base portion 38. Each routing system 36 extends and secures a ramp cable 40 to an outboard end 44 of bow ramp 28 from around a fixed pulley 42 rotatably mounted on base portion 38. Each ramp cable 40 is also wrapped about a displaceable pulley 46 of each routing system 36 and secured to base portion 38 at an anchor point 48.

A separate bidirectional actuator 50 is secured to each base portion 38 of each routing system 36 and is each connected to a separate displaceable pulley 46 to linearly displace it in opposite directions toward and away from each fixed pulley 42. Actuators 50 might be appropriately coupled hydraulic piston mechanisms that can be actuated to forcefully displace displaceable pulleys 42 either toward or away from the interconnected fixed pulley 42 and, in the process, pay out or reel in lengths of ramp cable 40. Since both ramp cables 40 are connected to outboard ends 44 of ramp 28, ramp 28 is selectively raised and lowered by this displacement by actuators 50. By wrapping multiple turns of each of ramp cables 40 around their associated pairs of fixed and displaceable pulleys 42 and 46, the length of the displacements created by actuators 50 can be magnified and/or adjusted to correlate with extensions and retractions of an elongate skirt cable 52 of bow skirt seal retraction system 10.

Skirt cable 52 has a first end 54 connected at the axis of one of displaceable pulleys 46 of one of the pair of routing systems 36 and its opposite second 56 connected at the axis of the other displaceable pulley 46 of the other of the pair of routing systems 36. In-between the first and second ends 54 and 56 skirt cable 52 is routed to longitudinally extend past load-guiding pulleys 58 secured to base portions 38 and through a series of belt-style attachment loops 60 on the essentially forward outside surface 62 of tubular-shaped flexible bow seal 14. The series of attachment loops 60 are preferably flexible, but can be rigid, to guide and retain skirt cable 52 on forward outside surface 62 of tubular-shaped flexible bow seal 14. Loops 60 extend in a laterally extending roughly line-shaped strip 64 that is located at a forward-most location on outer surface 62 on bow seal 14 to position skirt cable 52 and limit its motion along forward outside surface 62. This retention of skirt cable 52 allows skirt cable 52 to laterally slide through attachment loops 60 in strip 64 to respond to dynamic motions of flexible bow and coextensive seals 14 and 18 while vehicle 12 is underway and to assure a controlled retraction and letting out of flexible bow seal 14.

Referring to FIG. 4, the controlled retraction and letting out of flexible bow seal 14 by skirt retraction system 10 of the invention assures protection of bow seal 14 from pinching and other debilitating damage between bow ramp 28 and land surface 26 when vehicle 12 is off-cushion during loading operations. Retraction of flexible bow seal 14 is selectively initiated via skirt cable 52 and both routing systems 36. Displaceable pulleys 46 are simultaneously displaced toward fixed pulleys 42 by actuators 50 of both routing systems 36. This displacement pulls in lengths of skirt cable 52 and the tightened skirt cable 52 in strip 64 causes a compression or folding-in and retraction of flexible bow seal 14 toward vehicle 12 to its retracted position. Simultaneously during the drawing-in of skirt cable 52 and retraction of flexible bow seal 14, the simultaneous displacement of displaceable pulleys 46 toward fixed pulleys 42 unwinds or extends ramp cables 28. The unwinding ramp cables 40 lower bow ramp 28 to the lowered position and place ramp landing pads 66 on an exposed land surface 26. Since flexible bow seal 14 is retracted, placement of pads 66 of bow ramp 28 proceeds without damaging bow seal 14 during subsequent loading operations.

Referring to FIG. 3, bow skirt retraction system 10 of the invention provides controlled letting out of flexible bow seal 14 to allow vehicle 12 to efficiently proceed underway after loading operations have been completed and volumes of pressurized air are being appropriately vented to recreate air cushion 22. Extension or letting out of flexible bow seal 14 is selectively initiated via skirt cable 52 and both routing systems 36. Displaceable pulleys 46 are simultaneously displaced away from fixed pulleys 42 by actuators 50 of both routing systems 36. This displacement lets out lengths of skirt cable 52 and the slackened skirt cable 52 in strip 64 allows flexible bow seal 14 to inflate to its normal geometry at its extended position as vehicle 12 delivers volumes of pressurized air to seals 14 and 18 for on-cushion operation. Simultaneously during the letting out of skirt cable 52 and flexible bow seal 14, the simultaneous displacement of displaceable pulleys 46 away from fixed pulleys 42 winds or pulls-in ramp cables 40. The wound-in cables 40 raise bow ramp 28 to the raised position above and behind flexible bow seal 14 to allow vehicle to proceed underway after inflation of air cushion 22.

Air cushion vehicle 12 having the bow-skirt retraction system in place with skirt cable 52 extending across the outer forward surface of flexible bow seal 14 can travel across water or land surfaces and can proceed with loading operations with reduced risk of damage to the skirt seal structures. The host air cushion vehicle 12 for bow skirt seal retraction system 10 of the invention can rely on many different means to raise and lower ramp and skirt cables 40 and 52, including, but not limited to, electric motors or hydraulic and/or pneumatic pressure responsive mechanisms. Skirt retraction cable 52 and the ramp cable 40 are preferred to be mechanically coupled and operate dependently on each other for reliable operation. However, the selected mechanisms need not have deployment of the ramp and skirt cables' coordinated as specifically disclosed herein but may have a wide variety of actuation sequences and control devices and arrangements to retract and deploy differently configured variations of flexible bow seal 12 and ramp 28 to prevent damage to bow seal 12.

Having the teachings of this invention in mind, bow skirt seal retraction system 10 improves the efficiency of operation of an air cushion vehicle 12 in terms of reliability and ease of operation. Bow skirt seal retraction system 10 of the invention prevents pinching and undue Wear of the bow seal of an air cushion vehicle and eliminates unreliable internal arrangements of elastomeric members as presently designed that have proven unreliable for long term operation. The essentially protuberance-free uncomplicated design does not interfere with operational dynamics and improves operation of vehicle 12. Bow skirt seal retraction system 10 of the invention can be continuously monitored for real-time repair if ever needed to allow this improvement to be maintained throughout the operational cycle of vehicle 10.

Modifications and alternate embodiments of bow skirt seal retraction system 10 of the invention may be adapted, and differently configured cables in the form of natural or man-made straps or lines can be used for cables 40 and 52, mesh or net-like slings can be across seal 14 instead of a single cable 52 and a wide variety of different mechanisms can be used as the constituents of routing systems 36 to draw-in or let-out the cables. All components of system 10 can be made from a wide variety of tough non-corrosive or corrosion resistant materials that will hold up in the harsh marine environment. In addition to the uncomplicated, highly functional systems described, bow skirt seal retraction system 10 of the invention could have different shapes, sizes and materials to create hydrodynamically acceptable structures that accommodate different harsh operational conditions.

The disclosed components and their arrangements as disclosed herein, all contribute to the novel features of this invention. Bow skirt seal retraction system 10 of the invention, as disclosed herein, is not to be construed as limiting, but rather is intended to be demonstrative of this inventive concept. It should be readily understood that many modifications and variations of the present invention are possible within the purview of the claimed invention. It is to be understood that within the scope of the appended claims the invention may be practiced otherwise than as specifically described.

I claim:

1. A system for retracting and letting-out a laterally extending flexible bow seal having a forward outside surface with a forward-most portion on an air cushion vehicle having a bow ramp, the system comprising:

a plurality of attachment loops disposed in a laterally extending strip located on the forward-most portion of the laterally extending flexible bow seal;

an elongate skirt cable having opposite ends and extending through said attachment loops on the forward outside surface of the laterally extending bow seal;

cable routing systems mounted on said air cushion vehicle at opposite port and starboard ends of the bow ramp, each cable routing system being connected to a separate one of said opposite ends of said elongate skirt cable for selectively retracting and letting-out said laterally extending flexible bow seal; and a ramp cable extending from each said cable routing system to the bow ramp, both of said cable routing systems drawing in both said ramp cables to raise the bow ramp above said laterally extending bow seal and being let-out to lower the bow ramp to rest on a support surface;

wherein said cable routing systems are configured to selectively retract said laterally extending flexible bow seal with said skirt cable while simultaneously lowering the bow ramp by letting-out said ramp cables;

wherein said cable routing systems are configured to selectively let-out said laterally extending flexible bow seal with said skirt cable while simultaneously raising the bow ramp by drawing in said ramp cables; and wherein each cable routing system includes a fixed pulley and a moveable pulley displaceable toward and away from said fixed pulley by a linear actuator.

2. The system of claim 1 wherein each said moveable pulley is coupled to and displaced by a separate linear actuator of each said cable routing system toward and away from said fixed pulley to simultaneously retract or let-out said laterally extending flexible bow seal with said skirt cable and lower or raise the bow ramp by letting out or retracting said ramp cables.

3. A method of retracting and letting-out a laterally extending flexible bow seal having a forward outside surface with a forward-most portion on an air cushion vehicle having a bow ramp, the method comprising the steps of:

Disposing a series of attachment loops in a laterally extending strip located on the forward-most portion on the forward outside surface of the laterally extending flexible bow seal;

extending an elongate skirt cable through said series of attachment loops on the forward outside surface of the laterally extending bow seal, said elongate skirt cable having opposite ends;

connecting a separate cable routing system to each of said opposite ends of said elongate skirt cable; and simultaneously actuating each said cable routing system to selectively retract and let-out said laterally extending flexible bow seal;

locating a separate cable routing system at port and starboard locations on said air cushion vehicle at opposite sides of the bow ramp;

mounting a fixed pulley and a moveable pulley displaceable toward and away from said fixed pulley by a linear actuator in each said cable routing system;

extending a ramp cable from each said cable routing system to the bow ramp;

drawing in both said ramp cables with both said cable routing systems to raise the bow ramp above said laterally extending bow seal; and letting-out both said ramp cables with both said cable routing systems to lower the bow ramp to rest on a support surface.

4. The method of claim 3 further including the step of:

displacing each said moveable pulley toward said fixed pulley by actuating said linear actuator of each said cable routing system to simultaneously retract said laterally extending flexible bow seal by drawing in said skirt cable and lower the bow ramp by letting out said ramp cables to allow the bow ramp to rest on said support surface.

5. The method of claim 4 further including the step of:

displacing each said moveable pulley away from said fixed pulley by actuating said linear actuator of each said cable routing system to simultaneously let-out said laterally extending flexible bow seal by letting out said skirt cable and raise the bow ramp by drawing in said ramp cables to a position above the vehicle.

6. A system for retracting and letting-out a laterally extending flexible bow seal having a forward outside surface with a forward-most portion on an air cushion vehicle having a bow ramp with first and second ends, the system comprising:

a plurality of attachment loops disposed in a laterally extending arrangement across the forward-most portion of the bow seal;

first and second cable routing systems mounted on the air cushion vehicle at respective first and second ends of the bow ramp, each of said cable routing systems comprising (i) a base portion, (ii) a displaceable pulley, (iii) a bidirectional actuator having one end mounted on said base portion and another end coupled to said displaceable pulley, (iv) a fixed pulley mounted on said base portion, (v) a load guiding pulley mounted on said base portion, and (v) a ramp cable having one end secured to said base portion and another end secured to the bow ramp, said ramp cable being wrapped about said displaceable pulley and said fixed pulley;

an elongate skirt cable having first and second ends, said skirt cable extending through said attachment loops, said first end being coupled to said displaceable pulley via said load guiding pulley on said first cable routing system, and said second end being coupled to said displaceable pulley via said load guiding pulley on said second cable routing system;

wherein the lengths of said ramp cables and said skirt cable, and the sizes of said displaceable pulleys, said fixed pulleys, said load guiding pulleys, and said bidirectional actuators are selected so that the bow seal is drawn in toward the vehicle a sufficient distance to prevent impingement of the bow ramp on the bow seal when the bow ramp is in the fully lowered position.

\* \* \* \* \*